United States Patent
Nakayoshi et al.

(10) Patent No.: US 8,953,231 B2
(45) Date of Patent: Feb. 10, 2015

(54) DOCUMENT READING APPARATUS AND DOCUMENT READING METHOD

(71) Applicant: Canon Kabushiki Kaisha, Tokyo (JP)

(72) Inventors: Asahiro Nakayoshi, Matsudo (JP); Kenji Morita, Toride (JP); Yohei Katto, Nagareyama (JP); Akiko Kanno, Kashiwa (JP); Hidenori Sunada, Abiko (JP); Satoshi Seki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/102,933

(22) Filed: Dec. 11, 2013

(65) Prior Publication Data

US 2014/0168731 A1 Jun. 19, 2014

(30) Foreign Application Priority Data

Dec. 17, 2012 (JP) ................. 2012-274464

(51) Int. Cl.
| | | |
|---|---|---|
| *H04N 1/04* | (2006.01) | |
| *H04N 1/60* | (2006.01) | |
| *G06F 3/12* | (2006.01) | |
| *G06F 15/00* | (2006.01) | |
| *G06K 15/00* | (2006.01) | |
| *H04N 1/40* | (2006.01) | |
| *B65H 7/02* | (2006.01) | |
| *G03G 15/00* | (2006.01) | |
| *B42F 13/00* | (2006.01) | |
| *H04N 1/00* | (2006.01) | |

(52) U.S. Cl.
CPC ....... *H04N 1/00588* (2013.01); *H04N 1/00602* (2013.01); *H04N 1/00726* (2013.01); *H04N 1/00745* (2013.01); *H04N 1/00779* (2013.01); *H04N 1/00806* (2013.01); *H04N 1/00822* (2013.01); *H04N 1/00827* (2013.01)
USPC ............ 358/498; 358/1.9; 358/1.15; 358/1.7; 358/1.18; 358/3.23; 271/227; 271/228; 399/407; 399/367; 402/79

(58) Field of Classification Search
USPC ................ 358/498, 1.9, 1.15, 1.7, 1.18, 3.23; 271/227, 228; 399/407, 367; 402/79
See application file for complete search history.

(56) References Cited

U.S. PATENT DOCUMENTS

| | | | | |
|---|---|---|---|---|
| 6,071,030 | A * | 6/2000 | Hunter et al. ................. 402/79 |
| 7,046,953 | B2 * | 5/2006 | Hata et al. .................... 399/367 |
| 7,753,355 | B2 | 7/2010 | Mitamura | |
| 8,764,007 | B2 * | 7/2014 | Saito ............................. 271/228 |
| 2003/0156872 | A1 * | 8/2003 | Hirai ............................. 399/407 |
| 2012/0133093 | A1 * | 5/2012 | Saito ............................. 271/227 |

* cited by examiner

*Primary Examiner* — Charlotte M Baker
*Assistant Examiner* — Rury Grisham
(74) *Attorney, Agent, or Firm* — Fitzpatrick, Cella, Harper & Scinto

(57) ABSTRACT

Provided is a document reading apparatus capable of suppressing a shock that may occur when a trailing edge of a tabbed sheet passes through a roller pair. In an image reading section, when a document to be read is the tabbed sheet, a timing to start separation of the roller pair in response to detection of a trailing edge of the document is delayed by a time period corresponding to a tab length with respect to the timing to start separation when a document other than the tabbed sheet is conveyed. Thus, it is possible to prevent the shock when the trailing edge of the tabbed sheet passes through the roller pair, and to thereby suppress image reading failure due to the shock.

7 Claims, 14 Drawing Sheets

DOCUMENT READING APPARATUS AND DOCUMENT READING METHOD

BACKGROUND OF THE INVENTION

1. Field of the Invention

The present invention relates to a document reading apparatus and a document reading method for reading a document including a tabbed sheet while conveying the document.

2. Description of the Related Art

There is known a digital copying apparatus having an electronic sorting function that involves reading images of a plurality of documents, temporarily storing the images in an image memory, and repeatedly reading out and printing out the images in an arbitrary order for a desired number of copies. As this type of digital copying apparatus, there is known a digital copying apparatus including an automatic document feeder (ADF). In the ADF, a fed document is nipped by a roller pair, and is conveyed to a predetermined reading position. In this case, when a leading edge of the conveyed document enters the nip of the roller pair, a shock may occur in the document. The shock may also occur when a trailing edge of the document passes through the roller pair. Due to the shock, the position of the document is misaligned, thus leading to a problem of image reading failure such as color misregistration.

Further, there is a demand to read an image of a tabbed sheet. The tabbed sheet refers to a sheet to be used as a divider in a sheet bundle formed of a plurality of standard-size sheets, and to a non-standard-size sheet including a tab (protruding index) at an arbitrary position on one edge of the sheet. In general, thick paper is used for the tabbed sheet. Therefore, the above-mentioned shock becomes more significant.

As a related art for solving the problem described above, for example, there is known an image reading apparatus disclosed in U.S. Pat. No. 7,753,355. In this image reading apparatus, first and second roller pairs provided on upstream and downstream sides of the reading position are separable, respectively. That is, nipping forces of the first and second roller pairs are changed depending on the type of sheet, such as thick paper and thin paper. Thus, influence of the above-mentioned shock is mitigated.

In the image reading apparatus disclosed in U.S. Pat. No. 7,753,355, a timing of the separation when the document passes through each roller pair is determined with reference to a timing of trailing edge detection for the document using a sensor. When a timing of leading edge detection for the document is set as the reference, in a case where a plurality of documents different in length in a conveyance direction are to be read, it is necessary to detect information on the lengths of all the documents in advance.

In a case of using the tabbed sheet, however, there is a problem that cannot be solved even by the image reading apparatus disclosed in U.S. Pat. No. 7,753,355. This problem resides in that an installation position of the sensor is fixed but a position of the tab in a direction orthogonal to the document conveyance direction is not necessarily constant. This problem is described with reference to FIG. 17. In the example of FIG. 17, a tab T1 of a document A to be conveyed is located at an edge detection position of the sensor. Therefore, a document length of the document A is detected with reference to a trailing edge of the tab T1. On the other hand, a tab T2 of a document B is not located at the edge detection position of the sensor. Therefore, a document length of the document B is detected with reference to a trailing edge of the document B. As described above, the timings of trailing edge detection for the document A and the document B differ depending on the positions of the respective tabs. Therefore, the above-mentioned shock problem remains unsolved.

Note that, there is also known a related art for detecting the tab by arranging a plurality of sensors in the direction orthogonal to the document conveyance direction, to thereby detect the position of the trailing edge of the document irrespective of the position of the tab. In this related art, however, the plurality of sensors are necessary, resulting in cost increase. Further, there is also known a related art for controlling the timing of separation of rollers based on a document size and a detection result of the document trailing edge. In this related art, when the document size is the same, the rollers are separated at the same timing irrespective of presence and absence of the tab, and hence the above-mentioned shock problem still remains unsolved.

SUMMARY OF THE INVENTION

According to one embodiment of the present invention, there is provided a document reading apparatus, including: a conveyance section configured to convey a document with a tab or a document without the tab; an image reading section configured to read, at a reading position, an image of the document conveyed by the conveyance section; a designation section configured to designate a tab mode indicating that the document includes the tab, a document detection section configured to detect an edge of the document in a conveyance direction; a first roller pair, separably arranged on an upstream side of the reading position, configured to nip the document conveyed by the conveyance section; and a separation control section configured to start separation of the first roller pair when a predetermined time period elapses after a trailing edge of the document is detected by the document detection section, and configured to set, when the tab mode is designated, the predetermined time period to be longer than the predetermined time period when the tab mode is not designated.

Further features of the present invention will become apparent from the following description of exemplary embodiments (with reference to the attached drawings).

DESCRIPTION OF THE EMBODIMENTS

Now, embodiments of the present invention are described. Note that, in the following embodiments, a timing to start separation of a roller pair in a case of reading an image of a document including a tabbed sheet is delayed with respect to a timing to start the separation in a case of reading an image of a document other than the tabbed sheet. Thus, it is possible to prevent a shock that may occur when a trailing edge of the tabbed sheet passes through the roller pair, and to thereby prevent image reading failure due to the shock.

First Embodiment

Figure 1:
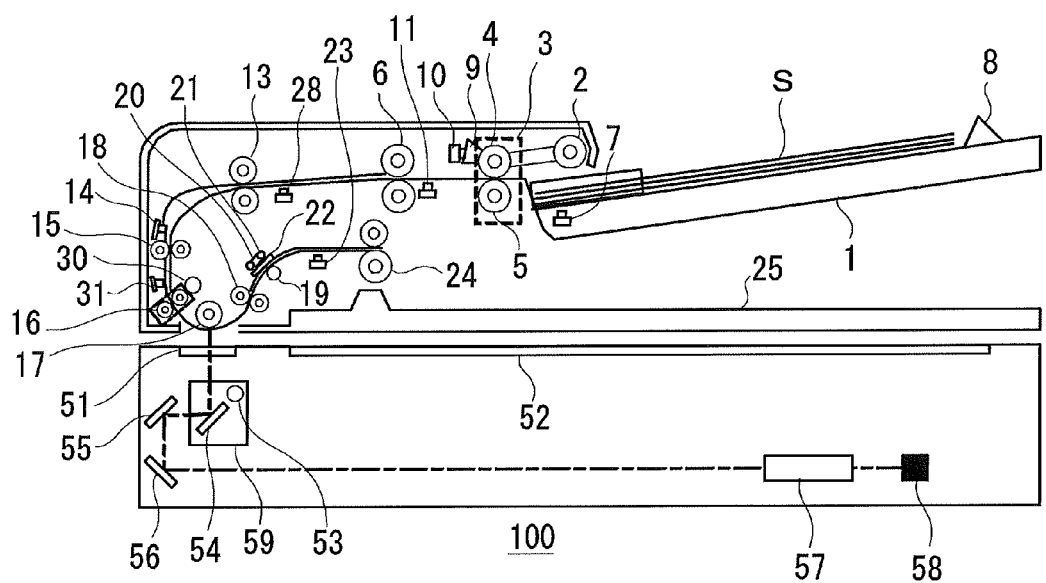
FIG. 1 is a schematic vertical sectional view illustrating a document reading apparatus according to a first embodiment of the present invention.

FIG. 1 is a schematic vertical sectional view illustrating a document reading apparatus according to a first embodiment of the present invention. This document reading apparatus includes an image reading section 100 and a controller section 200 described later. The image reading section 100 includes a document tray 1 capable of raising and lowering operations, on which a bundle of one or more documents S (document bundle) is placed, and a pickup roller 2 for feeding the uppermost document S in the document bundle into the apparatus. The document tray 1 includes a document detection sensor 7 for detecting presence and absence of the document S, and a size detection sensor 8 for detecting a size of the document S.

The image reading section 100 drives a lifter motor (not shown) or the like to lower the pickup roller 2 and raise the document tray 1 prior to the start of conveyance of the document S.

When the uppermost document S in the document bundle reaches a feed position, a sheet surface detection flag 9 that rotates in association with the pickup roller 2 abutting against the uppermost surface of the document bundle interrupts light emitted from a sheet surface detection sensor 10, and the sheet surface detection sensor 10 outputs an ON signal. In this manner, the raising operation of the document tray 1 is stopped.

When a feed operation is started, the document S fed by the pickup roller 2 reaches a separation roller pair 3 including a feed roller 4 and a retard roller 5. When a plurality of documents S are fed while overlapping one on top of another, the separation roller pair 3 separates the plurality of documents S into each single document S. To separate the documents S, a known retard separation technology may be employed. The document S passing through the separation roller pair 3 is conveyed by a conveyance roller pair 6 and a conveyance roller pair 13 to a registration roller pair 15 through separation sensors 11 and 28 and a registration sensor 14. The separation sensor 11 is arranged between the separation roller pair 3 and the conveyance roller pair 6, and the registration sensor 14 is arranged on an upstream side of the registration roller pair 15.

The registration roller pair 15 corrects skew feed of a leading edge of the document S. Specifically, the conveyance roller pair 13 brings the leading edge of the document S into abutment against a nip portion of the registration roller pair 15 in a stationary state to deflect the document S, and thus the registration roller pair 15 corrects the skew feed of the leading edge of the document S.

The document S passing through the registration roller pair 15 is conveyed in a direction of a flow-reading glass 51 through a conveying sensor 31, a conveying roller pair 16, and a platen roller 17. The conveying sensor 31 is arranged on an upstream side of the conveying roller pair 16. The conveying roller pair 16 is arranged on an upstream side of a reading position for a front surface of the document S. The platen roller 17 is held in contact with the flow-reading glass 51. The front surface of the document S passing through the platen roller 17 is irradiated by a light source lamp 53 provided in a front-surface reading unit 59. That is, the position of the platen roller 17 corresponds to the reading position for the front surface of the document S. The reflection light reaches a front-surface charge coupled device (CCD) line sensor 58 through mirrors 54, 55, and 56 and a lens 57. The front-surface CCD line sensor 58 outputs an image (electric signal) in accordance with a light intensity of the reflection light. In this manner, the image on the front surface of the document S is read.

The document S fed by the platen roller 17 passes through a conveying roller pair 18, and reaches a back-surface reading roller 19. The conveying roller pair 18 is arranged on a downstream side of the reading position for the front surface of the document S, and on an upstream side of a reading position for a back surface of the document S. The back-surface reading roller 19 is held in contact with a movement glass 22, and the back surface of the document S passing therethrough is irradiated by a light source lamp 21. That is, the position of the back-surface reading roller 19 corresponds to the reading position for the back surface of the document S. The reflection light reaches a back-surface CCD line sensor 20. The back-surface CCD line sensor 20 outputs an image (electric signal) in accordance with a light intensity of the reflection light. In this manner, the image on the back surface of the document S is read.

The document S fed by the back-surface reading roller 19 passes through a delivery sensor 23, and is then delivered onto a document delivery tray 25 by a delivery roller pair 24.

Note that, the rollers for conveying the document S are brought into press contact with the respective opposing rollers due to a predetermined press contact force. Thus, there is generated a conveyance force capable of conveying, for example, even thick paper. In addition to the above-mentioned press contact state, there is a state in which the press contact force is reduced as compared to the conveyance state and the nip portion of each roller pair is released (separating state). The press contact state and the separating state are controlled to switch therebetween as appropriate through transmission of a drive force of a separation motor 30 in a case of, for example, the conveying roller pair 16 depending on the type of document S.

Figure 2:
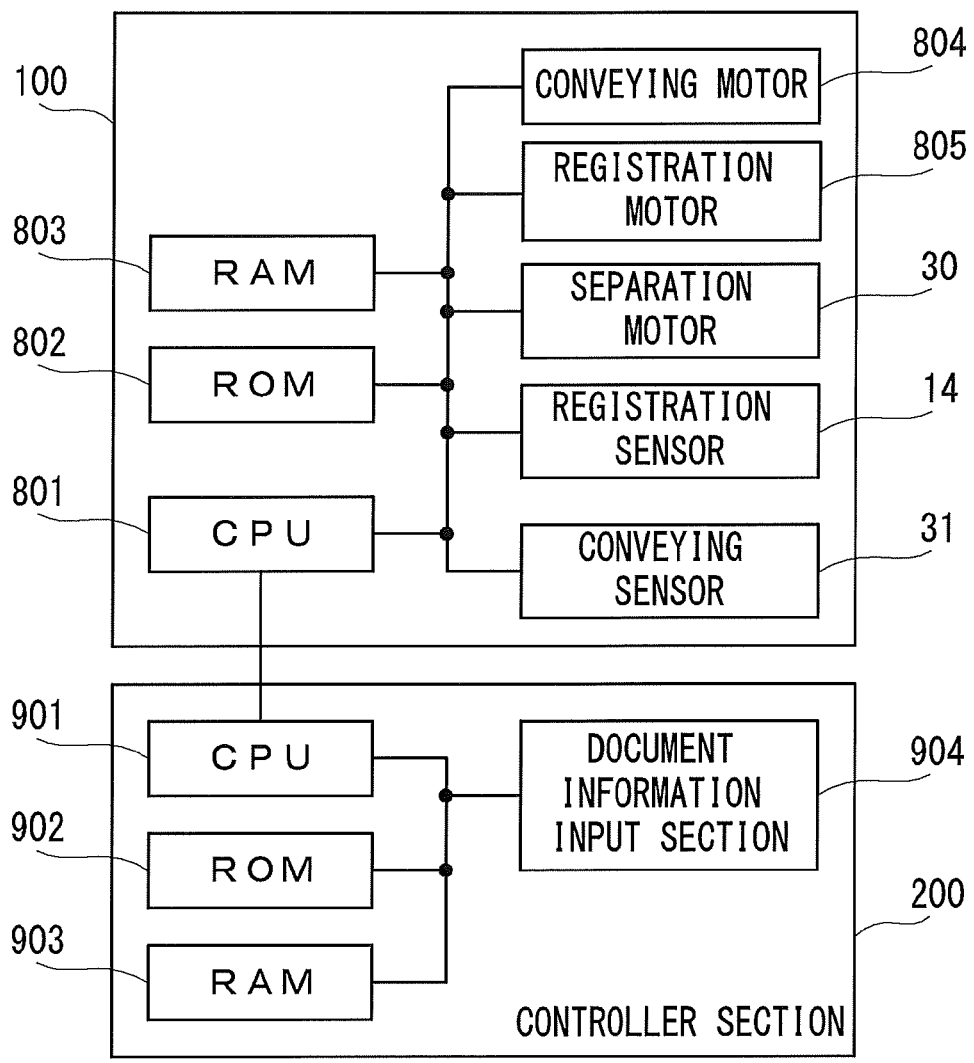
FIG. 2 is a control block diagram illustrating an image reading section.

Next, referring to FIG. 2, details of control for reading the document S by the image reading section 100 are described. The image reading section 100 includes a computer board (one type of computer) including a central processing unit (CPU) 801, a read only memory (ROM) 802, and a random access memory (RAM) 803. The ROM 802 stores a control program. The RAM 803 stores input data and work data. The CPU 801 reads and executes the control program to implement various functions for reading the document S.

Operation timings of a lead motor 804, a registration motor 805, and the separation motor 30 are controlled by the CPU 801. The lead motor 804 drives the conveying roller pair 16. The registration motor 805 drives the registration roller pair 15. The drive force of the separation motor 30 is transmitted so as to separate the conveying roller pair 16. The registration sensor 14 detects the leading edge of the document S (hereinafter referred to as "document leading edge"). The conveying sensor 31 detects the trailing edge of the document S (hereinafter referred to as "document trailing edge"). Further, the document detection sensor 7, the size detection sensor 8, the sheet surface detection sensor 10, the separation sensor 11, the registration sensor 14, the delivery sensor 23, and the light source lamps 21 and 53 are also connected to the CPU 801.

Next, the controller section 200 is described.

The controller section 200 includes a computer board including a CPU 901, a ROM 902, and a RAM 903. The CPU 901 reads and executes a remote control program stored in the ROM 902 to allow remote control of the image reading section 100. For example, the CPU 901 exchanges data on the size of the conveyed document S and the image reading control via a serial communication line between the CPU 901 and the CPU 801. A document information input section 904 is connected to the above-mentioned computer board. The document information input section 904 includes a display, which functions as an interface for a user. On an upper layer portion of the display, a liquid crystal display section having a touch panel formed thereon is arranged, and an instruction from the user is received through the touch panel. In response to the instruction input through the document information input section 904, the CPU 901 performs the remote control of the image reading section 100.

Figure 3:
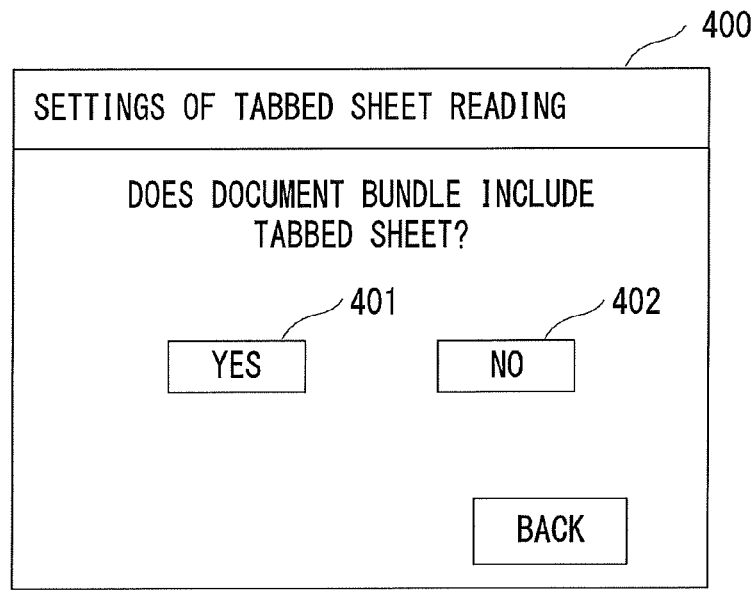
FIG. 3 is a diagram illustrating a screen configuration example of a document information input section.

Details of the instruction input from the user are described. FIG. 3 illustrates a display example of a display 400 of the document information input section 904. In the example of FIG. 3, the display 400 prompts the user to select whether or not to read a document bundle including a tabbed sheet. When the document bundle includes the tabbed sheet, the user designates a tab mode ("YES" button 401), and when the document bundle does not include the tabbed sheet, the user designates a non-tab mode ("NO" button 402). The designated content is set in the image reading section 100.

<Separation Control>

In the document reading apparatus of this embodiment, the CPU 801 of the image reading section 100 performs separation control. In FIG. 1, when a timing to start separation of the conveying roller pair 16 is earlier than a timing of passage of the document trailing edge through the registration roller pair 15, image reading failure such as color misregistration occurs. The image reading failure also occurs when a timing to complete separation of the conveying roller pair 16 is later than the timing of passage of the document trailing edge through the registration roller pair 15. This phenomenon is described with reference to FIGS. 4 to 6.

Figure 4:
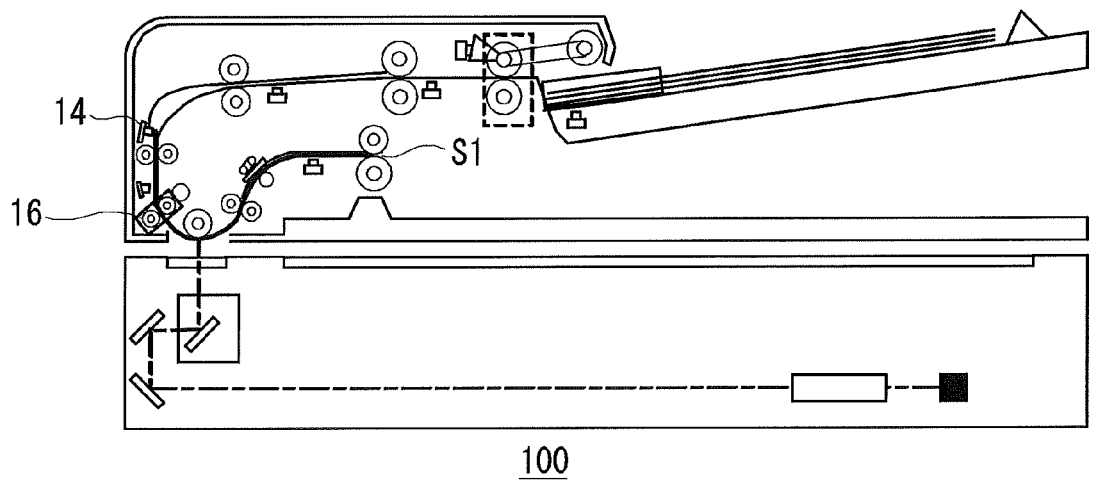
FIG. 4 is an explanatory view illustrating a process of conveying a document.

FIG. 4 illustrates a state in which, when reading an image of the tabbed sheet, the registration sensor 14 detects a trailing edge of a document S1 at a position other than a position of the tab. In this state, the separation of the conveying roller pair 16 is started at a timing determined in accordance with a size of the document S1 excluding the tab, that is, at the same timing as the timing for a document other than the tabbed sheet.

Figure 5:
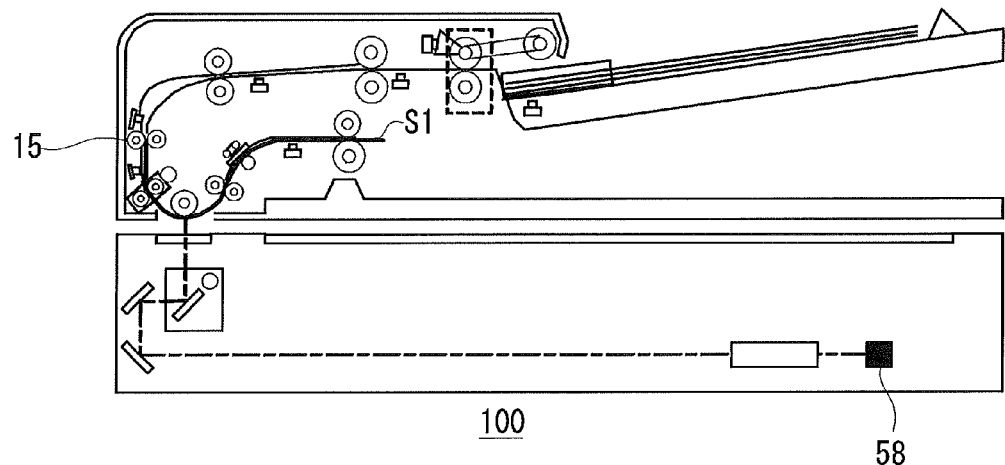
FIG. 5 is an explanatory view illustrating a process of conveying a document in an example different from that of FIG. 4.

FIG. 5 illustrates a state in which the tab of the document S1 is nipped by the registration roller pair 15. In this state, a shock occurs when the document trailing edge passes through the registration roller pair 15. As a result, when the front-surface CCD line sensor 58 reads an image, the image reading failure such as color misregistration occurs.

Figure 6:
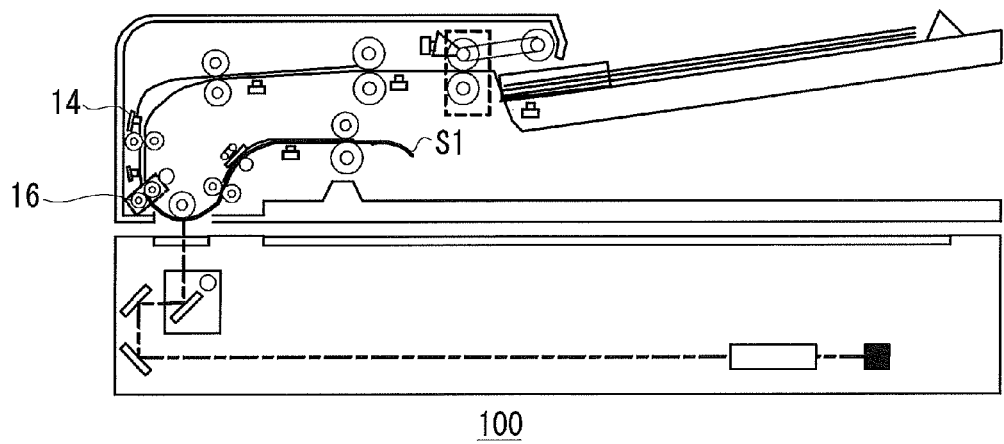
FIG. 6 is an explanatory view illustrating a process of conveying a document in an example different from those of FIGS. 4 and 5.

FIG. 6 illustrates a state in which the registration sensor 14 detects the document trailing edge at a position including the position of the tab. In this state, the timing to start separation of the conveying roller pair 16 is delayed as compared to the case where the registration sensor 14 detects the document trailing edge at the position other than the position of the tab. Therefore, the separation is not completed by the time when the document trailing edge passes through the conveying roller pair 16, and hence a shock occurs. In particular, in a case where the image reading speed is high, there is a risk in that the document trailing edge passes through the conveying roller pair 16 before the separation of the conveying roller pair 16 is completed. As a result, when the front-surface CCD line sensor 58 reads an image, the image reading failure occurs.

To address such trouble as described above, the image reading section 100 controls the registration roller pair 15, the conveying roller pair 16, the separation motor 30, and the like at appropriate timings, respectively. Now, control procedures according to this embodiment are described.

Figure 7:
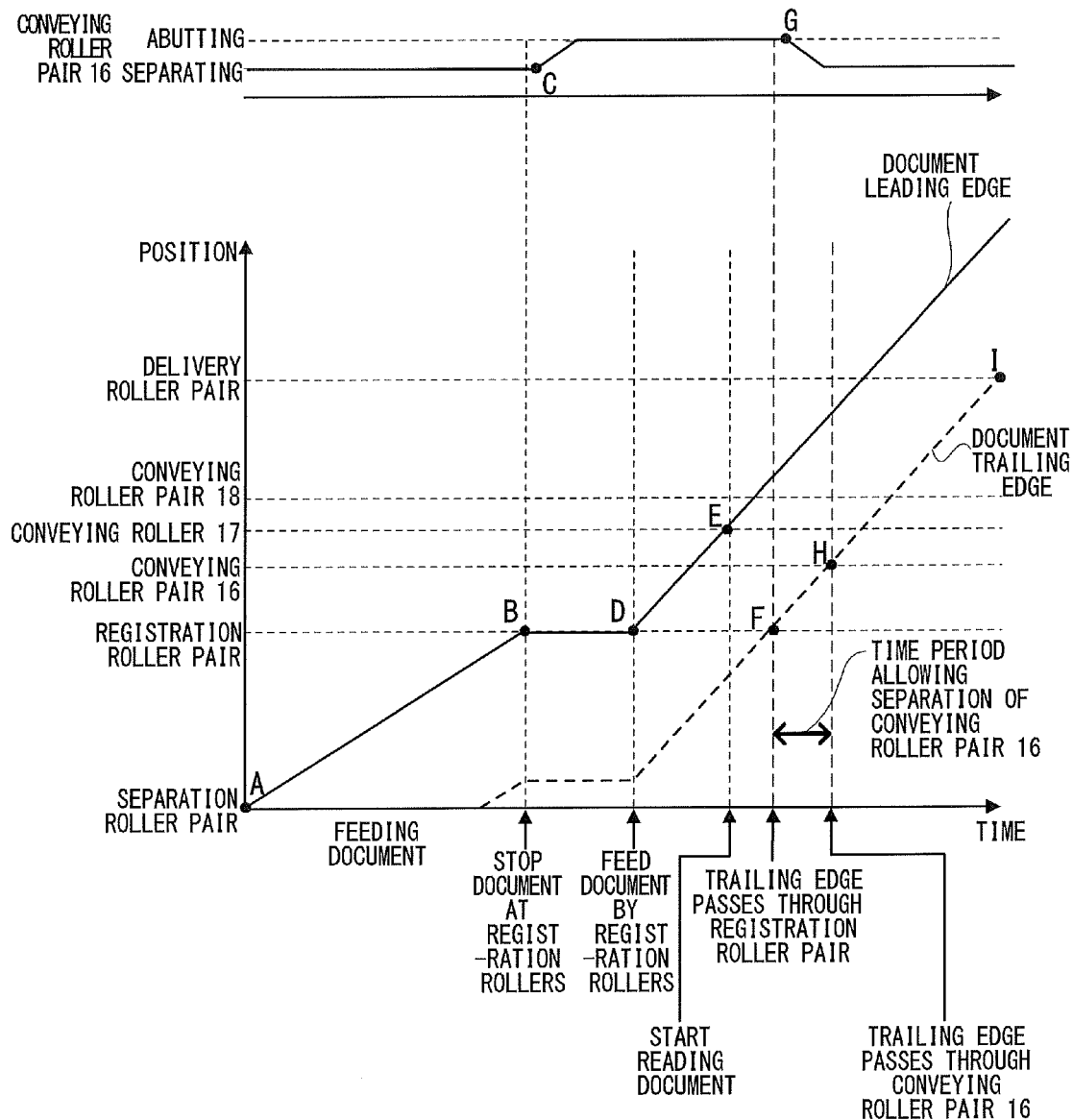
FIG. 7 is a timing chart illustrating conveyance control for a standard-size sheet.

First, description is given of control procedures to be performed in an operation from the feed to the delivery of a standard-size document without a tab (hereinafter referred to as "standard-size sheet"). Note that, in the following example, it is detected whether or not a length of the document in a conveyance direction is a predefined length, and when the length of the document in the conveyance direction is the predefined length, the document is determined to be the standard-size document. The length of the document in a direction (width direction) perpendicular to the conveyance direction may be detected, but in the following example, the length of the document in the width direction is not detected. FIG. 7 is a timing chart illustrating conveyance control to be performed by the CPU 801 in the operation from the feed to the delivery of the standard-size sheet. The reference symbols of the respective components are the same as those illustrated in FIG. 1.

In the timing chart of FIG. 7, the vertical axis represents the positions of various roller pairs on a conveyance path, which are determined based on the origin set to the position of the separation roller pair 3, and also represents the state of the conveying roller pair 16 (abutting state or separating state). The horizontal axis represents the time determined based on the origin set to a time point at which the document leading edge passes through the separation roller pair 3. In this timing chart, the shift of the document leading edge is indicated by the solid line, and the shift of the document trailing edge is indicated by the broken line.

Figure 8:
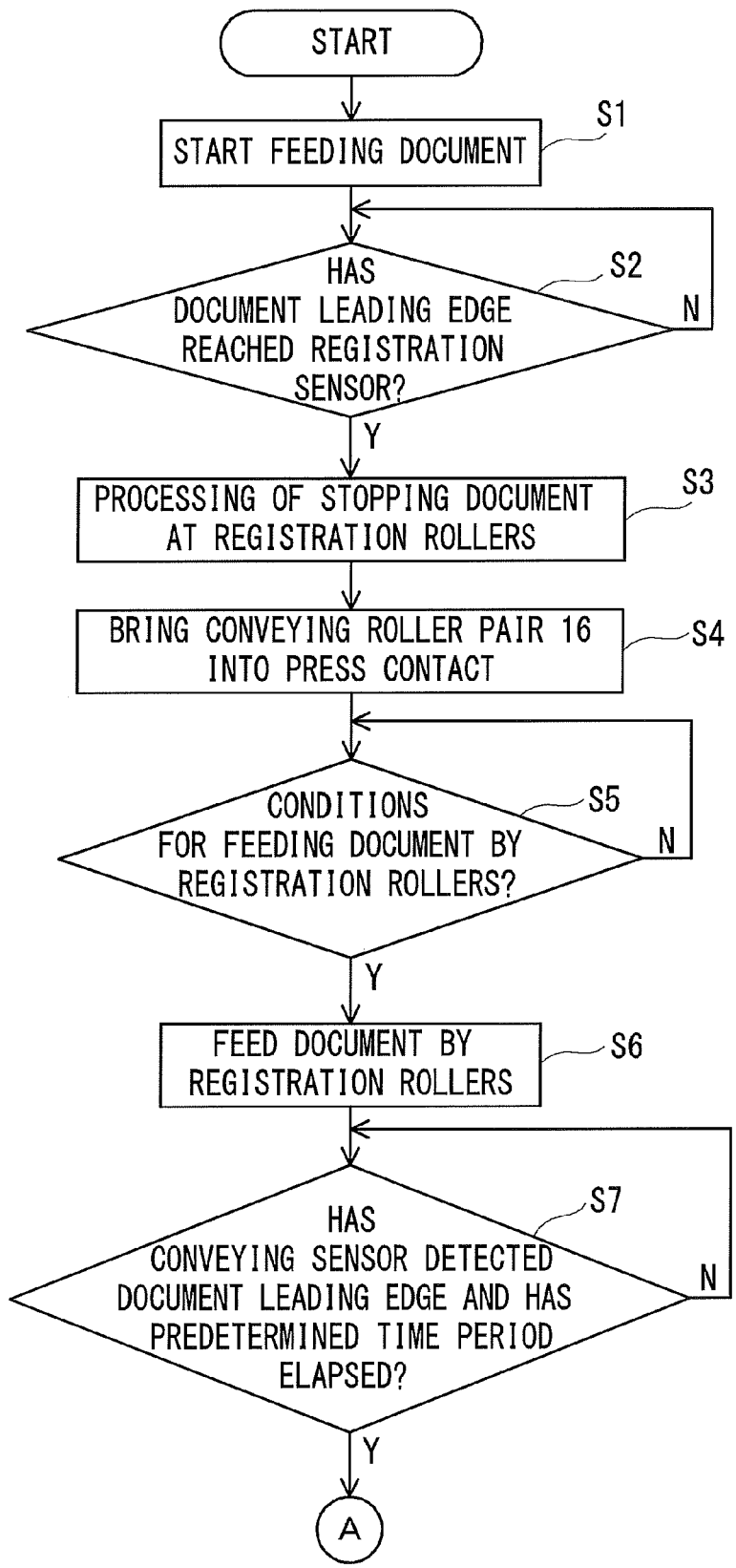
FIG. 8 is an explanatory flow chart illustrating procedures of main control processing involved in reading processing.
Figure 9:
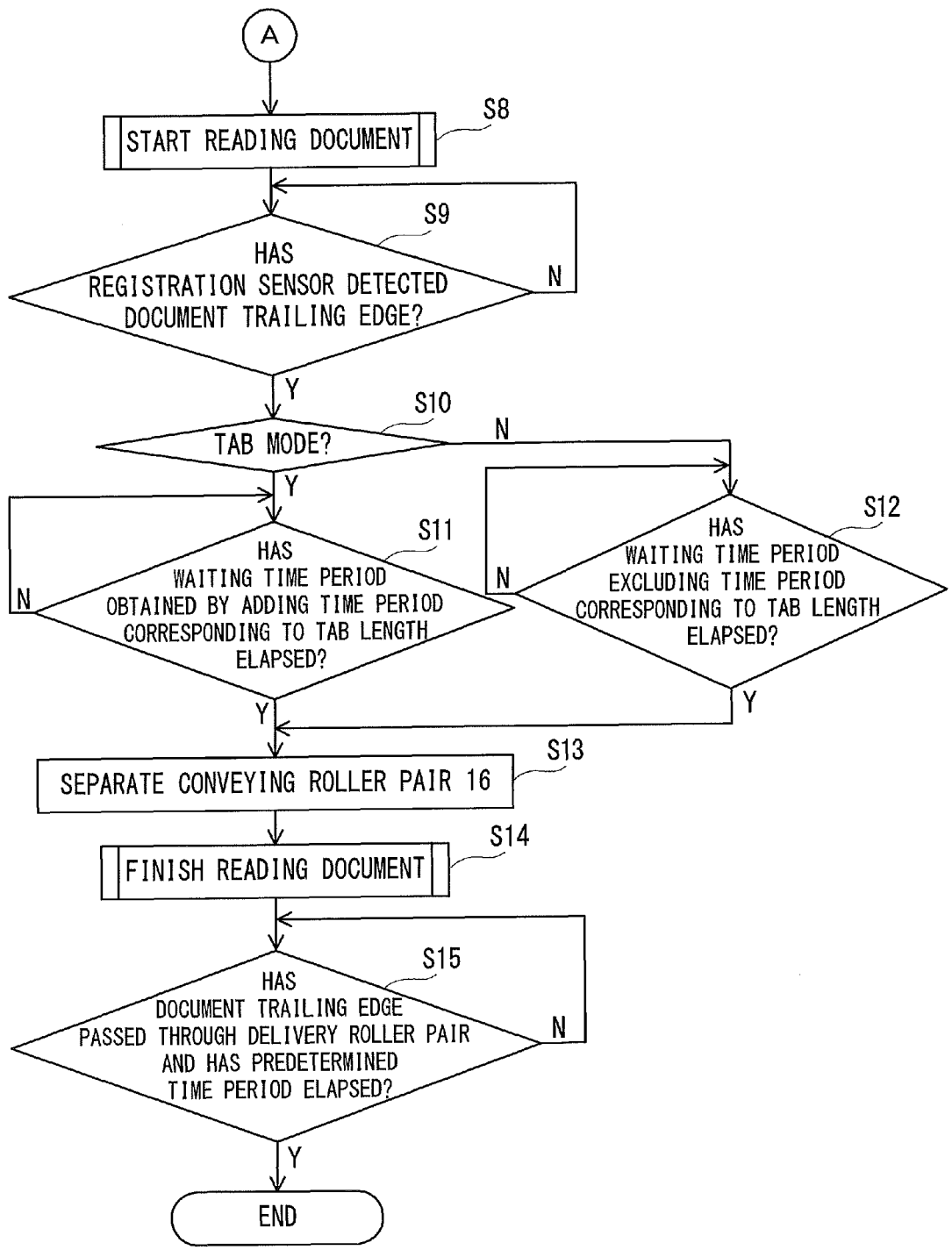
FIG. 9 is an explanatory flow chart illustrating the procedures of the main control processing involved in the reading processing subsequent to FIG. 8.

Referring to FIGS. 7, 8, and 9, description is given of the control procedures to be performed by the CPU 801 in the operation from the feed to the delivery of the document S, and the state in the process of conveying the document S. The reference symbols in FIG. 1 are used as appropriate for representing the drive mechanisms and the like of the document reading apparatus.

When an instruction to start reading the document S is input from the user through the document information input section 904, the CPU 901 of the controller section 200 notifies the CPU 801 of the image reading section 100 through serial communication that a reading job is started.

Referring to FIG. 8, when receiving a signal indicating that the reading job is started, the CPU 801 of the image reading section 100 raises the document tray 1 to start conveying (feeding) the document S (S1, "A" in FIG. 7). When the document leading edge reaches the registration sensor 14 (S2: Y), the CPU 801 determines, through use of a timer (not shown) inside the CPU 801, whether or not a preset deflection forming time period (first predetermined time period) elapses. In this period, the document S is caused to wait. The deflection forming time period is a time period required to deflect the document S. Then, the CPU 801 performs processing of stopping the document S at the registration roller pair 15 so that the registration roller pair 15 corrects the skew feed of the document S (S3, "B" in FIG. 7).

When the deflection forming time period elapses, the CPU 801 controls the separation motor 30 to start abutment of the conveying roller pair 16 (S4, "C" in FIG. 7). The reason why the abutment of the conveying roller pair 16 is started at this timing is because the conveying roller pair 16 is separated after the previous conveyance of the document S. The abutment is completed by the time when the document leading edge reaches the conveying roller pair 16, to thereby attain a state in which the document S can be conveyed.

When the conditions for feeding the document S by the registration roller pair 15 are satisfied (S5: Y), that is, when the CPU 801 receives a command indicating that the reading preparation is completed, the CPU 801 causes the registration roller pair 15 to start feeding the document S (S6, "D" in FIG. 7). When the conveying sensor 31 detects the document leading edge, the CPU 801 determines, through use of the timer, whether or not a second predetermined time period elapses (S7). The second predetermined time period is a conveyance time period required until the document leading edge reaches the platen roller 17 after the conveying sensor 31 detects the document leading edge. The second conveyance time period is set in advance. After the conveyance time period elapses, the CPU 801 proceeds to the processing in FIG. 9 (S7: Y).

Referring to FIG. 9, the CPU 801 starts reading the document S (S8), and determines whether or not the registration sensor 14 detects the document trailing edge (S9). When the registration sensor 14 detects the document trailing edge (S9: Y), the CPU 801 determines whether or not the tab mode is set (S10). When the tab mode is set, the CPU 801 determines, through use of the timer, whether or not a waiting time period obtained by adding a time period corresponding to a tab length (tab width) (third predetermined time period) elapses (S10: Y, S11). When the tab mode is not set, on the other hand, the CPU 801 determines whether or not a waiting time period excluding the time period corresponding to the tab length, that is, a waiting time period for a standard-size sheet (fourth predetermined time period) elapses (S10: N, S12). Until each waiting time period elapses, the abutting state of the conveying roller pair 16 is maintained (S11: N, S12: N). The waiting time period obtained by adding the time period corresponding to the tab length (third predetermined time period) is described later. In the example of FIG. 7, the waiting time period for a standard-size sheet (fourth predetermined time period) is a time period between "F" and "G" on the horizontal axis. The waiting time period for a standard-size sheet is set based on a process speed and a length of the conveyance path from the registration sensor 14 to the registration roller pair 15. The process speed refers to a speed at which the platen roller 17 conveys the document S, and corresponds to a conveyance speed for reading the document S. For example, when the process speed is 600 [mm/s] and the distance from the registration sensor 14 to the registration roller pair 15 is 20 [mm], the waiting time period for a standard-size sheet is 34 [ms].

When each waiting time period elapses (S11: Y, S12: Y), the CPU 801 controls the separation motor 30 to start separation of the conveying roller pair 16 (S13, "G" in FIG. 7). Through the separation control as described above, the shock can be prevented when reading each document of the document bundle that does not include the tabbed sheet.

Note that, the separation control is completed by the time when the document trailing edge passes through the conveying roller pair 16 ("H" in FIG. 7). For example, it is assumed that the process speed is 600 [mm/s] and the distance from the registration roller pair 15 to the conveying roller pair 16 is 65 [mm]. In this case, the time period available for the separation control is about 108 [ms]. The time period required for the separation control is about 50 [ms], and hence a sufficient length of time can be secured to complete the separation control.

When the separation of the conveying roller pair 16 is completed, the CPU 801 finishes the predetermined reading processing (S14). After that, the CPU 801 determines, through use of the timer, whether or not a predetermined time period required until the document trailing edge passes through the delivery sensor 23 and further through the delivery roller pair 24 ("I" in FIG. 7) (fifth predetermined time period) elapses (S15), and continues to convey the document S until the predetermined time period elapses (S15: N). After the predetermined time period elapses (S15: Y), the CPU 801 finishes the control for reading the document bundle.

Figure 10:
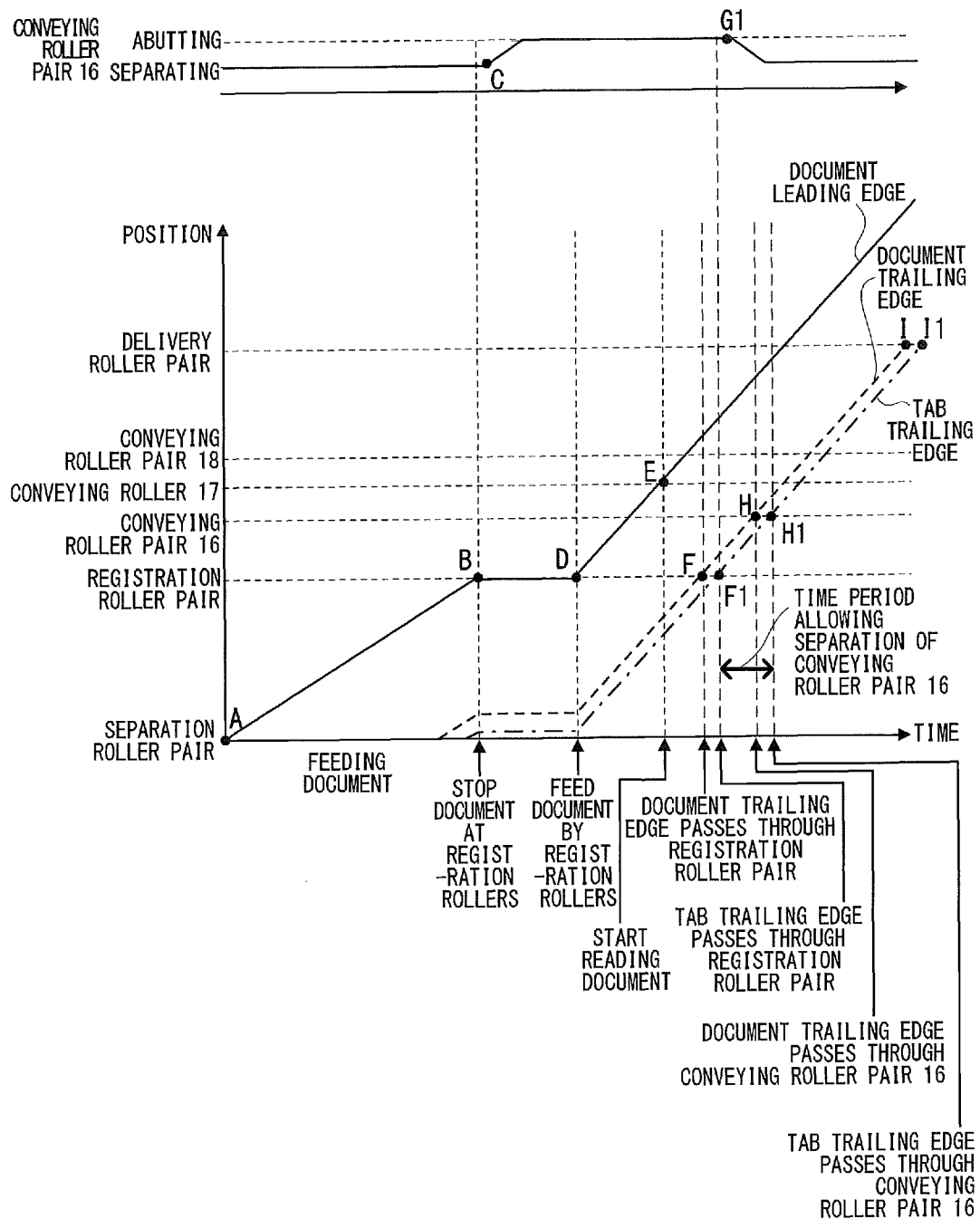
FIG. 10 is a timing chart illustrating conveyance control for a tabbed sheet.

In this case, the waiting time period obtained by adding the time period corresponding to the tab length (third predetermined time period: FIG. 9, S11) is described in detail. FIG. 10 is a timing chart illustrating conveyance control to be performed in an operation from the feed to the delivery of the tabbed sheet in the case where the tab mode is set (S10: Y). FIG. 10 is different from FIG. 7 in that the shift of the document trailing edge excluding the tab is indicated by the broken line and the shift of the trailing edge of the tab (hereinafter referred to as "tab trailing edge") is indicated by the chain line. The document trailing edge that passes through the registration roller pair 15 shifts along the locus of "F-H-I" in FIG. 10. On the other hand, the tab trailing edge shifts along the locus of "F1-H1-I1". Further, the timing to start separation of the conveying roller pair 16 is changed to a timing "G1" delayed with respect to the timing "G" in FIG. 7.

In the example of FIG. 10, the waiting time period obtained by adding the time period corresponding to the tab length (third predetermined time period) is a time period between "F1" and "G1" on the horizontal axis. This waiting time period is set based on a predetermined tab length as well as the process speed and the length of the conveyance path from the registration sensor 14 to the registration roller pair 15.

As described above, after the tab trailing edge passes through the registration roller pair 15 ("F1" in FIG. 10), the CPU 801 waits for the elapse of the waiting time period obtained by adding the time period corresponding to the tab length (third predetermined time period), and starts separation of the conveying roller pair 16 ("G1" in FIG. 10). Through the control as described above, it is possible to prevent the passage of the document trailing edge through the registration roller pair 15 under a state in which the conveying roller pair 16 is separated, and to thereby prevent the shock that may occur when reading the document bundle including the tabbed sheet.

Note that, also in the tab mode, the separation control needs to be completed by the time when the tab trailing edge passes through the conveying roller pair 16 ("H1" in FIG. 10). In this example, the process speed is 600 [mm/s], the distance from the registration roller pair 15 to the conveying roller pair 16 is 65 [mm], and the tab length is 25 [mm]. Therefore, the time period available for the separation control is about 67 [ms] (=(65-25) [mm]/600 [mm/s]). The time period required for the separation control is about 50 [ms], and hence a sufficient length of time can be secured to complete the separation control.

Figure 11:
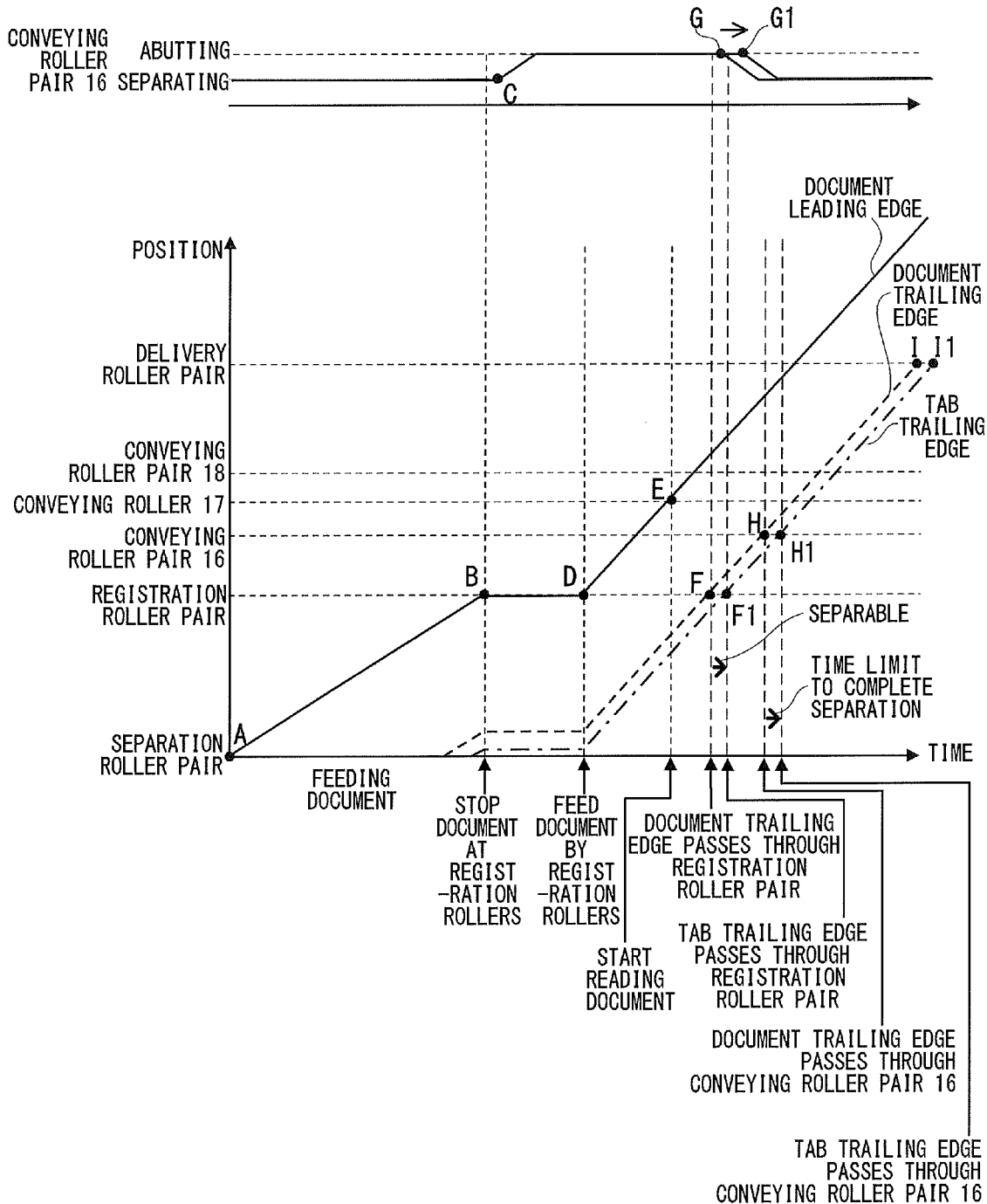
FIG. 11 is a timing chart illustrating a difference in timing to start separation depending on whether or not a tab mode is set.

FIG. 11 illustrates a difference in timing to start separation of the conveying roller pair 16 between the case where the tab mode is set and the case where the tab mode is not set. The example of FIG. 11 and the example of FIG. 10 are different from each other in the timing to start separation of the conveying roller pair 16 (upper part of the figure). In the case where the tab mode is not set, the timing of passage of the document trailing edge through the registration roller pair 15 is indicated by "F" in FIG. 11. In this case, after the waiting time period for a standard-size sheet (fourth predetermined time period) elapses, the separation of the conveying roller pair 16 is started ("G" in FIG. 11). In the case where the tab mode is set, on the other hand, the timing of passage of the document trailing edge through the registration roller pair 15 is indicated by "F1" in FIG. 11. Then, at the time point "G1" in FIG. 11, the separation of the conveying roller pair 16 is started. In this manner, the timing to start separation of the conveying roller pair 16 is shifted with reference to the tab trailing edge.

As described above, in the document reading apparatus of this embodiment, in the case of reading the document bundle that does not include the tabbed sheet, the document S is caused to wait, with reference to the document trailing edge, for the predetermined time period until the document S passes through the registration roller pair 15, and on the other hand, in the case of reading the document bundle including the tabbed sheet, the document S is caused to wait, with reference to the tab trailing edge, for the predetermined time period until the document S passes through the registration roller pair 15. Therefore, the document trailing edge or the tab trailing edge can pass through the registration roller pair 15 before the separation is started, that is, when the document S is nipped by the conveying roller pair 16.

Further, the separation of the conveying roller pair 16 is completed by the time when the document trailing edge or the tab trailing edge passes through the conveying roller pair 16. Therefore, it is possible to prevent the shock that may occur when the document trailing edge or the tab trailing edge passes through the conveying roller pair 16.

Second Embodiment

When the reading speed of the image reading section 100 becomes higher, the tab trailing edge may pass through the conveying roller pair 16 before the separation of the conveying roller pair 16 is completed. For example, in the timing chart of FIG. 11, the timing "G1" may further be delayed with respect to the timing "H1".

Therefore, in a second embodiment of the present invention, description is given of an example in which the timing to start the separation or the separation speed of the conveying roller pair 16 is changed based on a document length.

Note that, description is omitted for parts overlapping with the above-mentioned components and functions of the image reading section 100.

Figure 12:
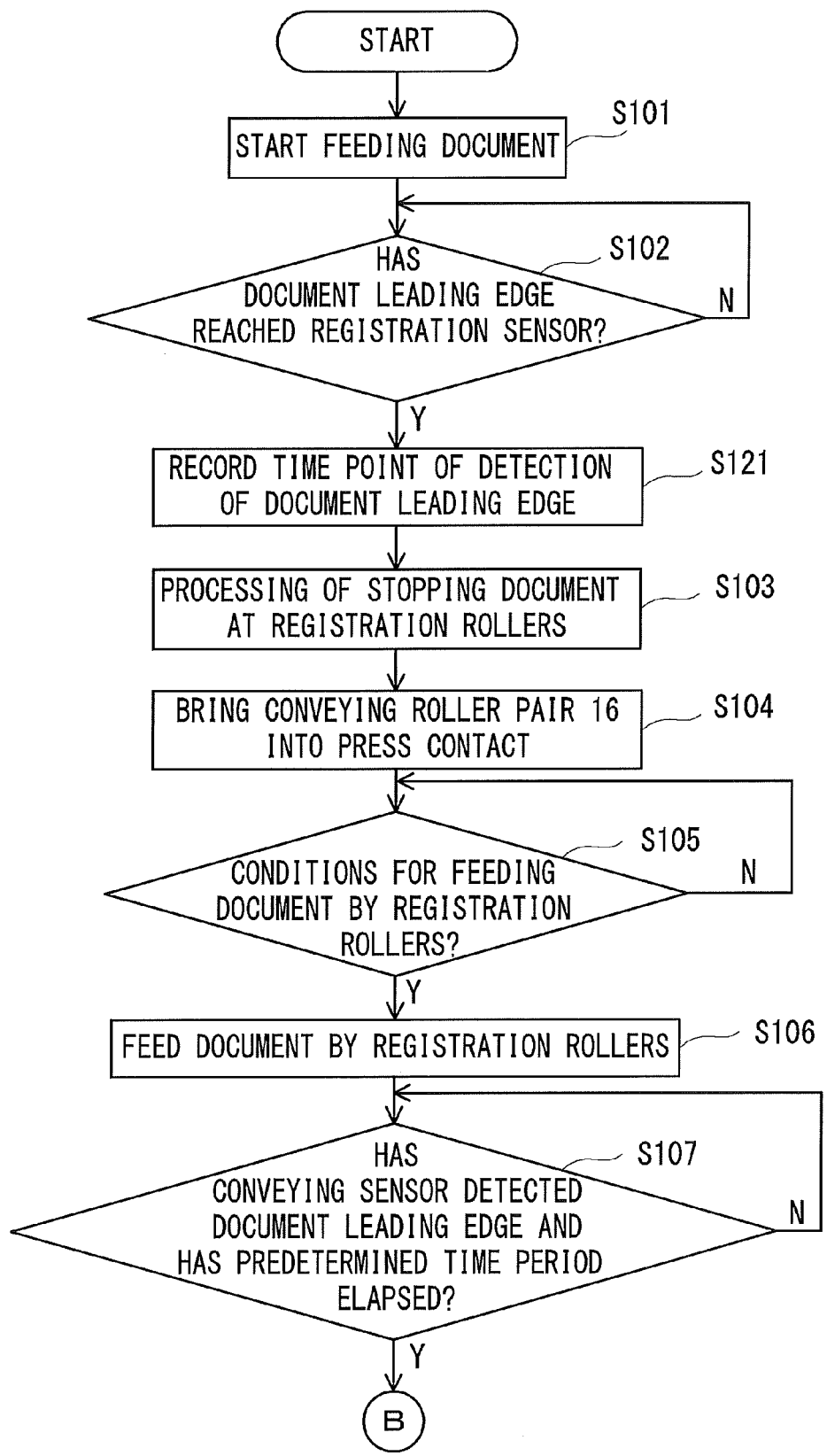
FIG. 12 is an explanatory flow chart illustrating control procedures involved in reading processing according to a second embodiment of the present invention.
Figure 13:
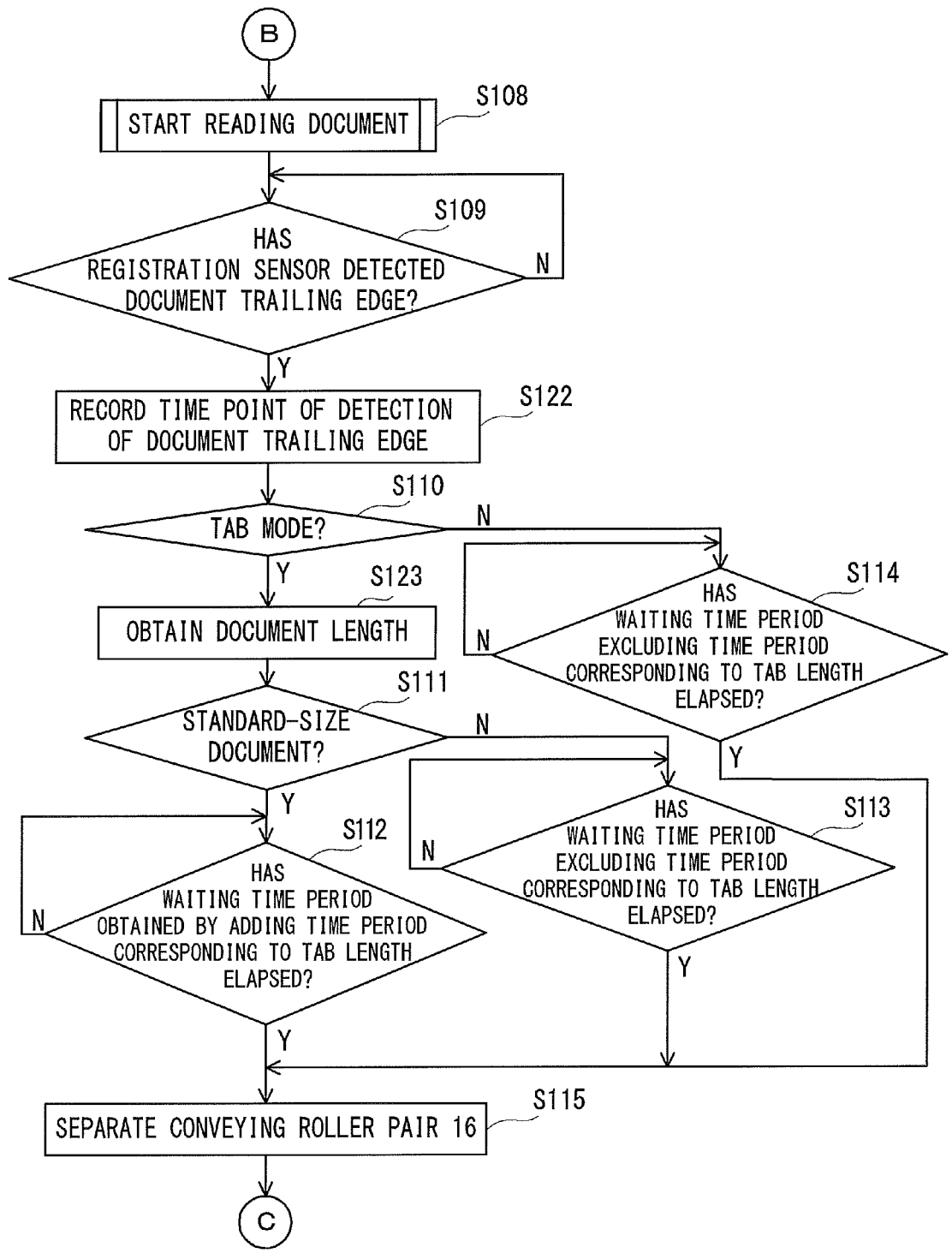
FIG. 13 is an explanatory flow chart illustrating the control procedures subsequent to FIG. 12.
Figure 14:
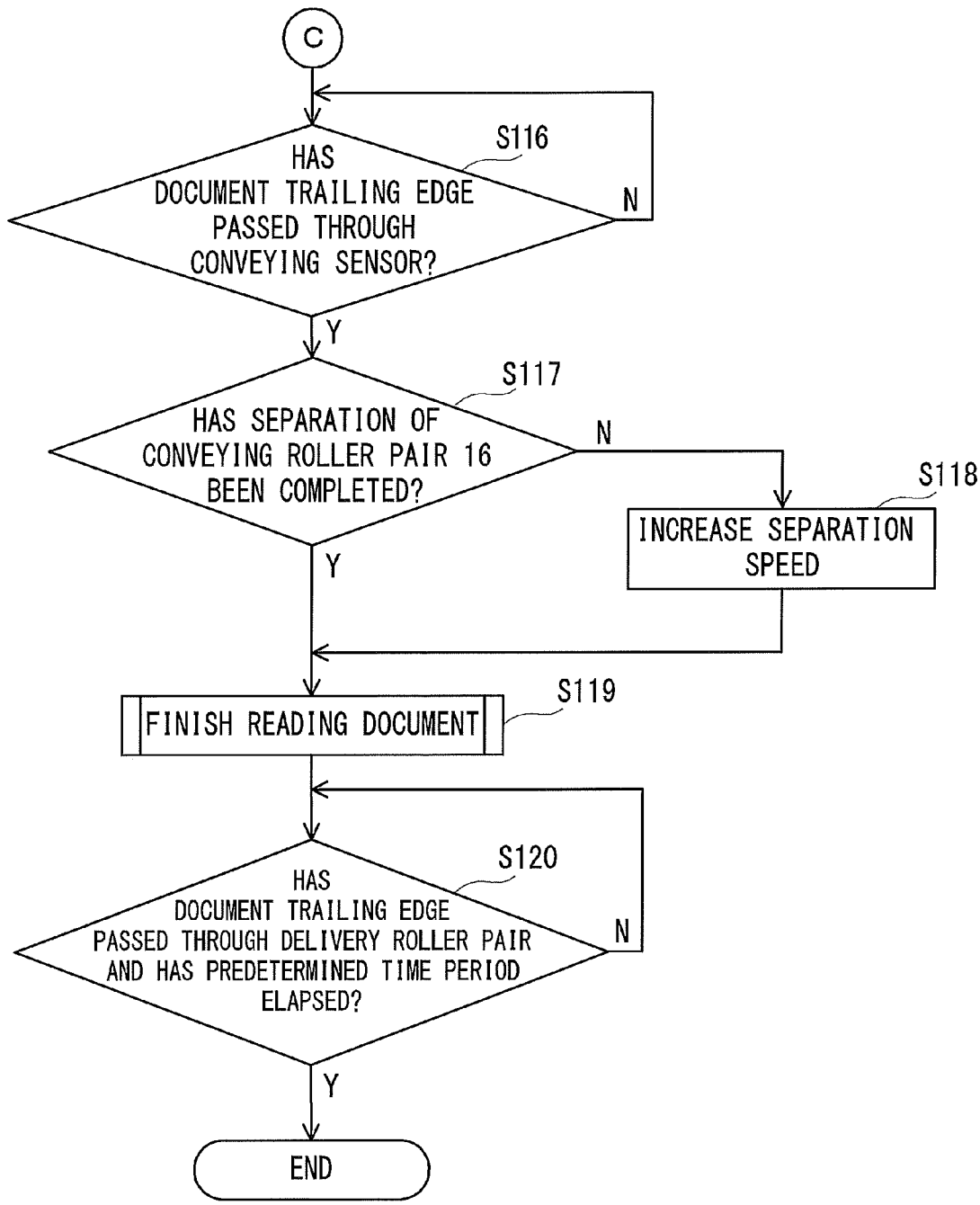
FIG. 14 is an explanatory flow chart illustrating the control procedures subsequent to FIG. 13.

FIGS. 12, 13, and 14 are explanatory flow charts illustrating procedures of main control processing to be performed in an operation from the start to the end of reading the document S that is a tabbed sheet. The control under the procedures is executed by the CPU 801 of the image reading section 100.

Figure 15:
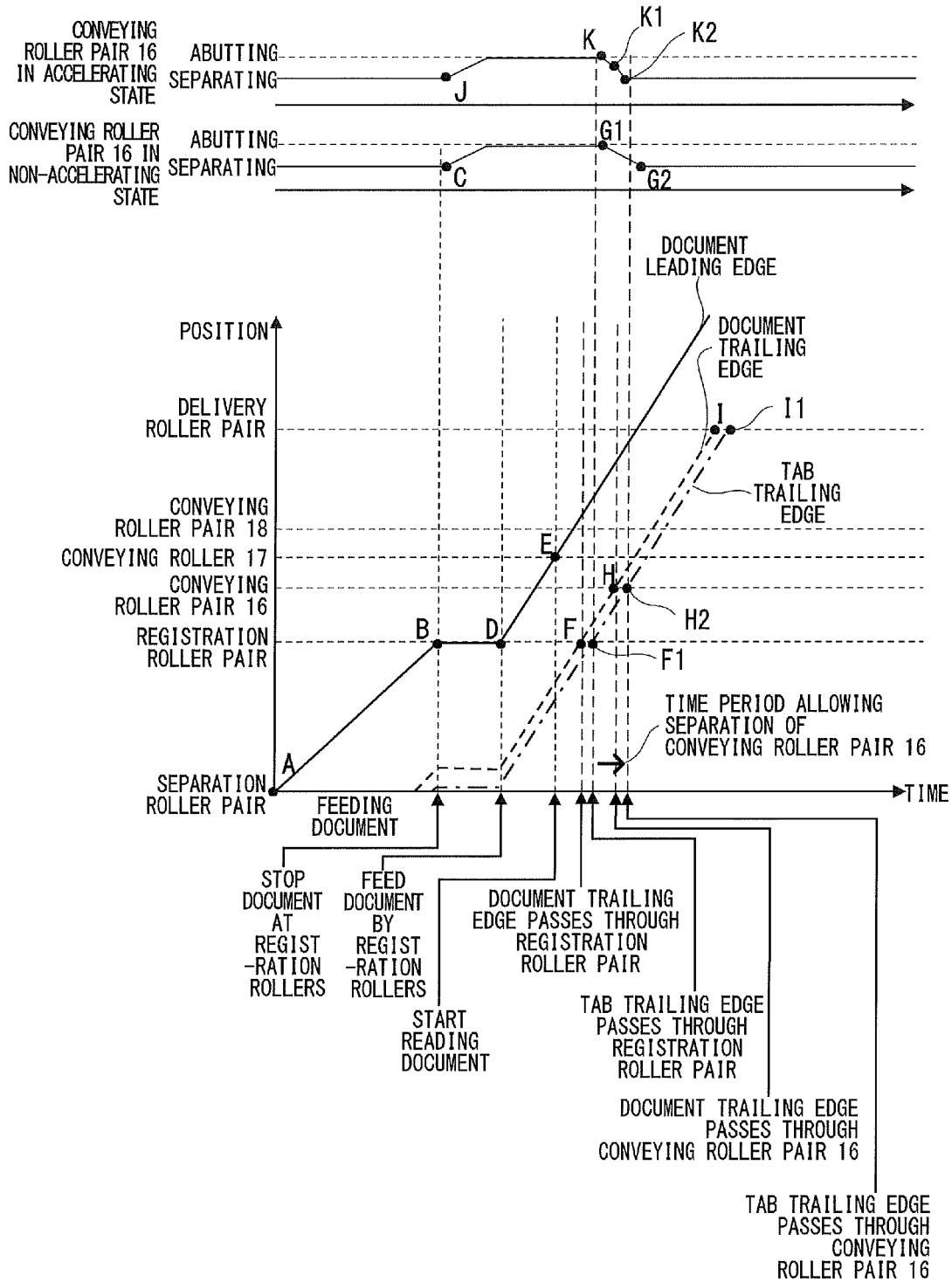
FIG. 15 is a timing chart illustrating conveyance control for a tabbed sheet according to the second embodiment.

FIG. 15 is a timing chart illustrating conveyance control to be performed by the CPU 801 in an operation from the feed to the delivery of the tabbed sheet. In FIG. 15, the vertical axis represents the positions of various roller pairs on the conveyance path, which are determined based on the origin set to the position of the separation roller pair 3, and also represents the state of the conveying roller pair 16 (abutting state or separating state) and the separation speed (accelerating state or non-accelerating state) thereof. In the accelerating state, the separation speed of the conveying roller pair 16 is increased. The horizontal axis represents the time determined based on the origin set to the time point at which the leading edge of the document S passes through the separation roller pair 3. In the example of FIG. 15, the shift of the document leading edge is indicated by the solid line, and the shift of the document trailing edge excluding the tab is indicated by the broken line. Further, the shift of the tab trailing edge is indicated by the chain line. The document trailing edge shifts along the locus of "F-H-I", and the tab trailing edge shifts along the locus of "F1-H2-I1".

In this embodiment, document length determination control, waiting time period control, time point detection, document length detection, acceleration control for the separation motor 30, and the like are taken as differences from the first embodiment. Now, details of those kinds of control are described.

When an instruction to start reading the document S is input from the user through the document information input section 904, the CPU 901 of the controller section 200 notifies the CPU 801 of the image reading section 100 through serial communication that a reading job is started.

Referring to FIG. 12, when receiving a signal indicating that the reading job is started, the CPU 801 of the image reading section 100 raises the document tray 1 to start conveying (feeding) the document S (S101, "A" in FIG. 15). When the document leading edge reaches the registration sensor 14 (S102: Y), the CPU 801 stores a time point of detection of the document leading edge in the RAM 803 so as to obtain the document length (S121). Further, similarly to the first embodiment, the CPU 801 causes the document S to wait for the deflection forming time period (first predetermined time period), and performs the processing of stopping the document S at the registration roller pair 15 (S103, "B" in FIG. 15).

When the deflection forming time period elapses, the CPU 801 controls the separation motor 30 to start abutment of the conveying roller pair 16 in the non-accelerating state (S104, "C" in FIG. 15). When the conditions for feeding the document S by the registration roller pair 15 are satisfied (S105: Y), the CPU 801 drives the registration roller pair 15 to resume feeding the document S (S106, "D" in FIG. 15).

When the conveying sensor 31 detects the document leading edge, the CPU 801 determines whether or not the above-mentioned conveyance time period (second predetermined time period) elapses (S107). After the conveyance time period elapses, the CPU 801 proceeds to the processing in FIG. 13 (S107: Y).

Referring to FIG. 13, the CPU 801 starts reading the document S (S108), and determines whether or not the registration sensor 14 detects the document trailing edge (S109, "F" in FIG. 15). When the registration sensor 14 detects the document trailing edge (S109: Y), the CPU 801 stores a time point of detection of the document trailing edge by the registration sensor 14 in the RAM 803 so as to obtain the document length (S122). Further, the CPU 801 determines whether or not the tab mode is set (S110). When the tab mode is set (S110: Y), the CPU 801 obtains the document length (S123). The document length is obtained based on the time points stored in the RAM 803 in S121 and S122, the time period in which the document S is stopped at the registration roller pair 15, the process speed, and the like.

The CPU 801 determines whether or not the obtained document length conforms to a standard size (S111). This determination is performed based on, for example, an absolute value of a difference between the detected document length and a length contained in a table of sub-scanning lengths of standard-size documents, which is held in the ROM 802. When the absolute value of the difference is, for example, more than 10 [mm], the CPU 801 determines that the size of the document S is not the standard size but a non-standard size having the tab length added thereto. When the absolute value of the difference is 0 [mm] to 10 [mm], on the other hand, the CPU 801 determines that the size of the document S is the standard size.

When it is determined that the size of the document S is the standard size (S111: Y, the trailing edge is detected at the timing "F" in FIG. 15), the trailing edge of the document S excluding the tab is detected, and hence it is necessary to take the tab length into consideration. Therefore, the CPU 801 causes the document S to wait for the waiting time period obtained by adding the time period corresponding to the tab length (S112: N). This waiting time period is obtained based on the process speed and a value obtained by subtracting the tab length (length from the document trailing edge to the tab trailing edge) from the length of the conveyance path from the registration roller pair 15 to the conveying roller pair 16. For example, when the process speed is 900 [mm/s], the distance from the registration roller pair 15 to the conveying roller pair 16 is 65 [mm], and the tab length is 25 [mm], the waiting time period is 44 [ms] (=(65-25) [mm]/900 [mm/s]).

When it is determined in S111 that the size of the document S is not the standard size (S111: N, the trailing edge is detected at the timing "F1" in FIG. 15), the tab trailing edge is already detected, and hence it is unnecessary to take the tab length into consideration. Therefore, the CPU 801 causes the document S to wait for the waiting time period excluding the time period corresponding to the tab length, that is, the waiting time period for a standard-size sheet (fourth predetermined time period) (S113: N). This waiting time period is obtained based on the process speed and the length of the conveyance path from the registration sensor 14 to the registration roller pair 15. When the process speed is 900 [mm/s] and the distance from the registration sensor 14 to the registration roller pair 15 is 20 [mm], the waiting time period is 22 [ms] (=20 [mm]/900 [mm/s]). Note that, also when the tab mode is not set in S110 (S110: N), the CPU 801 waits for the elapse of the waiting time period for a standard-size sheet (S114: N).

When each waiting time period elapses (S112: Y, S113: Y, S114: Y), after the tab trailing edge passes through the registration roller pair 15 ("F1" in FIG. 15), the CPU 801 drives the separation motor 30 to start separation of the conveying roller pair 16 (S115, "G1" in FIG. 15). Through the separation control as described above, the shock can be prevented even when the standard-size document and the non-standard-size document are present in a mixed manner.

Note that, the separation control needs to be completed by the time when the document trailing edge passes through the conveying roller pair 16 ("H" in FIG. 15). In this example, the process speed is 900 [mm/s], the distance from the registration roller pair 15 to the conveying roller pair 16 is 65 [mm], and the tab length is 25 [mm]. Therefore, about 44 [ms] (=(65-25) [mm]/900 [mm/s]) can be secured as the time period available for the separation.

However, it takes about 50 [ms] to complete the separation, and hence the trailing edge of the document S passes through the conveying roller pair 16 before the separation is completed ("G2" in FIG. 15). To avoid this phenomenon, the separation control is performed under the procedures illustrated in FIG. 14.

Referring to FIG. 14, the CPU 801 waits until the document trailing edge passes through the conveying sensor 31 (S116: N). When it is detected that the document trailing edge passes through the conveying sensor 31 (S116: Y) but the separation of the conveying roller pair is not completed yet (S117: N), the CPU 801 increases the speed of the separation motor 30 to increase the separation speed (S118). In the example of FIG. 15, the separation speed is increased in a separation zone from "K1" to "K2". The incompletion of the separation of the conveying roller pair 16 may be determined based on, for example, the fact that the drive of the separation motor 30 is not stopped.

Through the increase in separation speed as described above, the control can be performed so as to reliably complete the separation before the document trailing edge passes through the conveying roller pair 16 completely ("K2" in FIG. 15).

After the separation is completed, the CPU 801 performs processing of finishing the reading operation (S119). After that, the CPU 801 waits until the document trailing edge passes through the delivery roller pair 24 and a predetermined time period elapses (S120: N). After the predetermined time period elapses, the CPU 801 finishes the separation control (S120: Y).

Now, detailed description is given of the fact that the separation can be completed before the document trailing edge passes through the conveying roller pair 16.

It is assumed that the process speed is 900 [mm/s], the distance from the registration roller pair 15 to the conveying roller pair 16 is 65 [mm], the tab length is 25 [mm], and the distance from the conveying sensor 31 to the conveying roller pair 16 is 20 [mm]. It takes 50 [ms] to separate the conveying roller pair by a distance of 5 [mm]. That is, the normal separation speed is 100 [mm/s].

The following example is directed to a case where the separation speed of the conveying roller pair 16 is increased by 1.5 times under the above-mentioned condition when it is detected that the document trailing edge passes through the conveying sensor 31 but the separation is not completed yet.

In a zone from the registration roller pair 15 to the conveying sensor 31, the document trailing edge does not pass through the conveying sensor 31 yet, and hence the control is performed at the normal separation speed. In a zone from the conveying sensor 31 to the conveying roller pair 16, on the other hand, the document trailing edge already passes through the conveying sensor 31. Therefore, when the separation is not completed yet, the control is performed so as to increase the separation speed (150 [mm/s]).

A time period required for movement of the document trailing edge through the zone from the registration roller pair 15 to the conveying sensor 31 is obtained, and a separation distance of the conveying roller pair 16 at the normal separation speed (100 [mm/s]) is determined (zone from "K" to "K1" in FIG. 15).

The distance from the registration roller pair 15 to the conveying sensor 31 is 45 [mm] (=65-20 [mm]). When the document trailing edge is set as a reference, the tab length is subtracted, and hence the distance is 20 [mm] (=45-25 [mm]). The process speed is 900 [mm/s], and hence the time period available for the separation in this case is 22 [ms] (=20 [mm]/

900 [mm/s]). Thus, the separation distance of the conveying roller pair 16 in this zone is 2.2 [mm] (=100 [mm/s]×22 [ms]).

Then, a time period required for movement of the document trailing edge through the zone from the conveying sensor 31 to the conveying roller pair 16 is obtained, and a separation distance of the conveying roller pair 16 at the increased separation speed (150 [mm/s]) is determined (zone from "K1" to "K2" in FIG. 15).

The distance from the conveying sensor 31 to the conveying roller pair 16 is 20 [mm]. The process speed is 900 [mm/s], and hence the time period available for the separation in this case is 22 [ms] (=20 [mm]/900 [mm/s]). Thus, the separation distance of the conveying roller pair 16 in this zone is 3.3 [mm] (=150 [mm/s]×22 [ms]).

When the separation distances of the conveying roller pair 16 in both the zones are added to each other, the conveying roller pair 16 can be separated by 5.5 [mm] during a period in which the document trailing edge moves in the zone from the registration roller pair 15 to the conveying roller pair 16. Therefore, a sufficient length of time can be secured to separate the conveying roller pair 16 by 5 [mm].

Note that, the rotational speed of the separation motor 30 may be increased in advance to perform the separation without switching the separation speed. However, there is such a drawback that operation noise in the separation control is constantly at a high level. Therefore, the processing of increasing the separation speed (accelerating the separation) is performed only when the separation of the conveying roller pair 16 is not completed in S117 of FIG. 14. As a result, it is possible to prevent the situation where the operation noise is constantly at a high level.

Figure 16:
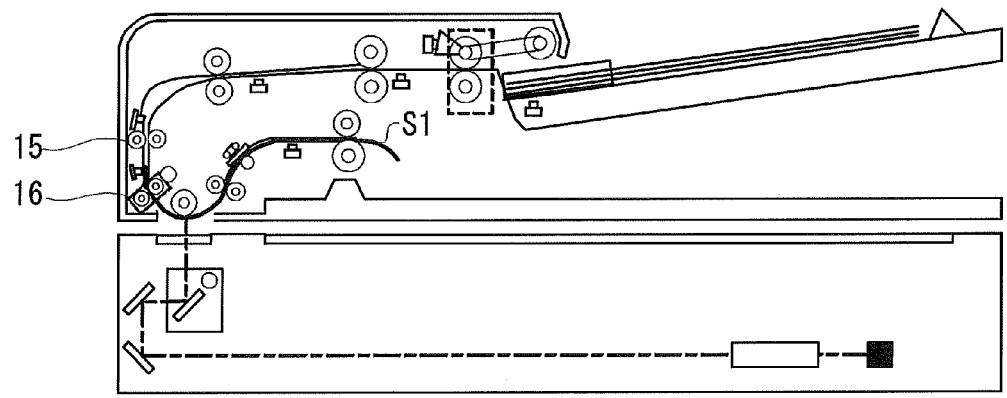
FIG. 16 is an explanatory view illustrating a process of conveying a document in a case where conveying rollers are separated in a proper manner.
Figure 17:
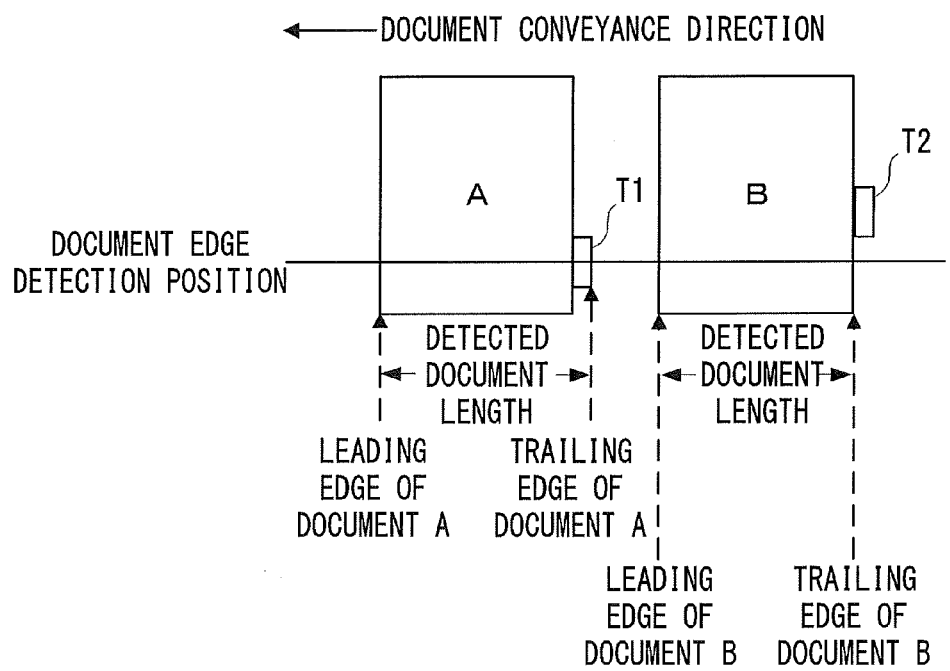
FIG. 17 is an explanatory view illustrating how edges of tabbed sheets are detected.

In the image reading section 100 that undergoes the separation control as described above, when the document trailing edge is located between the registration roller pair 15 and the conveying roller pair 16 as illustrated in FIG. 16, the separation control for the conveying roller pair 16 can be performed.

As described above, in the document reading apparatus of this embodiment, it is determined whether or not the document length includes the length of the tab, and depending on the determination result, the timing to start separation is changed. Thus, the shock can be prevented at the time of the reading operation.

Further, the separation speed of the conveying roller pair 16 can be increased, and hence the control can be performed so as to complete the separation before the document trailing edge passes through the conveying roller pair 16 completely. Thus, the shock can be prevented at the time of the reading operation.

The present invention has been described in detail by way of the above-mentioned embodiments, but the scope of the present invention is not limited to those embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-274464, filed Dec. 17, 2012, which is hereby incorporated by reference herein in its entirety.

What is claimed is:

1. A document reading apparatus, comprising:
   a conveyance section configured to convey a document with a tab and a document without the tab;
   an image reading section configured to read, at a reading position, an image of the document conveyed by the conveyance section;
   a designation section configured to designate a tab mode indicating that a document bundle including the document with the tab is to be read;
   a document detection section configured to detect the document conveyed by the conveyance section;
   a first roller pair, separably arranged on an upstream side of the reading position, configured to nip the document conveyed by the conveyance section; and
   a separation control section configured to start separation of the first roller pair when a predetermined time period elapses after a trailing edge of the document is detected by the document detection section, and configured to set, when the tab mode is designated, the predetermined time period to be longer than the predetermined time period when the tab mode is not designated.

2. A document reading apparatus according to claim 1, wherein, when the tab mode is designated, the separation control section sets the predetermined time period to be longer by a time period corresponding to a length of the tab.

3. A document reading apparatus according to claim 1,
   wherein the conveyance section comprises a second roller pair arranged on an upstream side of the first roller pair, and
   wherein, when the tab mode is designated, the separation control section controls the separation of the first roller pair so as to avoid starting the separation of the first roller pair before the trailing edge of the document passes through the second roller pair.

4. A document reading apparatus according to claim 1, further comprising a size determination section configured to determine, based on a result of the detection by the document detection section, whether or not a length of the document in a conveyance direction is a predetermined length,
   wherein, when it is determined that the length of the document in the conveyance direction is not the predetermined length and the tab mode is designated, the separation control section delays a timing to start the separation of the first roller pair by a time period corresponding to a length of the tab with respect to the timing to start the separation of the first roller pair when the length of the document in the conveyance direction is the predetermined length.

5. A document reading apparatus according to claim 4, wherein, when it is determined that the length of the document in the conveyance direction is not the predetermined length, the separation control section completes the separation of the first roller pair before a trailing edge of the tab of the document that is being conveyed passes through the first roller pair.

6. A document reading apparatus according to claim 5,
   wherein the size determination section comprises another document detection section, arranged on an upstream side of a position of the first roller pair, configured to detect presence and absence of the document at a position at which the another document detection section is arranged, and
   wherein, when it is detected that the document is absent at the position at which the another document detection section is arranged and the separation of the first roller pair is not completed, the separation control section increases a speed of the separation of the first roller pair.

7. A document reading method, comprising:
   conveying a document with a tab and a document without the tab, and reading, at a reading position, an image of the conveyed document; and
   at the time of reading the image, when an edge of the document in a conveyance direction is detected, and when a tab mode indicating that a document bundle including the document with the tab is to be read is designated, setting a time period required until separation of a roller pair, which is separably arranged on an upstream side of the reading position and configured to nip the document, is started after the edge of the document in the conveyance direction is detected, to be longer than the time period when the tab mode is not designated.

\* \* \* \* \*